(12) United States Patent
Keite-Telgenbuscher et al.

(10) Patent No.: US 11,866,614 B2
(45) Date of Patent: Jan. 9, 2024

(54) PRESSURE-SENSITIVE ADHESIVE COMPOUND CONTAINING A CROSS-LINKED NANOPARTICLE NETWORK, METHOD OF PRODUCTION AND USE THEREOF

(71) Applicant: tesa SE, Norderstedt (DE)

(72) Inventors: Klaus Keite-Telgenbuscher, Hamburg (DE); Christian Schuh, Hamburg (DE); Bernd Luhmann, Norderstedt (DE); Thilo Dollase, Hamburg (DE); Minyoung Bai, Hamburg (DE); Thorsten Krawinkel, Hamburg (DE)

(73) Assignee: TESA SE, Norderstedt (DE)

( * ) Notice: Subject to any disclaimer, the term of this patent is extended or adjusted under 35 U.S.C. 154(b) by 25 days.

(21) Appl. No.: 17/471,642

(22) Filed: Sep. 10, 2021

(65) Prior Publication Data
US 2021/0403771 A1    Dec. 30, 2021

Related U.S. Application Data

(62) Division of application No. 16/369,406, filed on Mar. 29, 2019, now Pat. No. 11,142,672, which is a
(Continued)

(30) Foreign Application Priority Data

Jan. 29, 2013   (EP) .................................... 13152987

(51) Int. Cl.
*C09J 125/08* (2006.01)
*C09J 153/00* (2006.01)
(Continued)

(52) U.S. Cl.
CPC ............. *C09J 125/08* (2013.01); *C08L 63/00* (2013.01); *C09J 7/387* (2018.01); *C09J 153/00* (2013.01);
(Continued)

(58) Field of Classification Search
CPC .................................................. C08L 2205/04
See application file for complete search history.

(56) References Cited

U.S. PATENT DOCUMENTS 3,729,313 A   4/1973   Smith
3,741,769 A   6/1973   Smith
(Continued)

FOREIGN PATENT DOCUMENTS

DE   692 21 324 T2   3/1998
DE   103 61 540 A1   7/2005
(Continued)

OTHER PUBLICATIONS

International Search Report dated Apr. 16, 2014, dated Apr. 25, 2014.
(Continued)

*Primary Examiner* — Alexandre F Ferre
(74) *Attorney, Agent, or Firm* — Norris McLaughlin, PA

(57) ABSTRACT

A structural adhesive bond formed with a pressure-sensitive adhesive that comprises at least two components forming one phase each, from which an interpenetrating network with at least two phases is produced by a cross-linking build-up reaction, the first phase and second phase having at least a softening point temperature of less than 23° C. and greater than 23° C., respectively, the two phases having a morphology of a cross-linked nanoparticle network after the build-up reaction.

20 Claims, 4 Drawing Sheets

Related U.S. Application Data division of application No. 14/648,423, filed as application No. PCT/EP2014/050500 on Jan. 13, 2014, now abandoned.

(51) Int. Cl.
| | |
|---|---|
| *C09J 153/02* | (2006.01) |
| *C09J 7/38* | (2018.01) |
| *C08L 63/00* | (2006.01) |
| *B82Y 30/00* | (2011.01) |
| *B82Y 40/00* | (2011.01) |
| *H10K 50/844* | (2023.01) |

(52) U.S. Cl.
CPC .......... *C09J 153/025* (2013.01); *B82Y 30/00* (2013.01); *B82Y 40/00* (2013.01); *C08L 2205/04* (2013.01); *C09J 2301/122* (2020.08); *C09J 2301/124* (2020.08); *C09J 2301/302* (2020.08); *C09J 2301/312* (2020.08); *C09J 2425/00* (2013.01); *C09J 2453/00* (2013.01); *H10K 50/844* (2023.02); *Y10T 428/269* (2015.01); *Y10T 428/287* (2015.01)

(56) References Cited

U.S. PATENT DOCUMENTS

| | | |
|---|---|---|
| 4,058,401 A | 11/1977 | Crivello |
| 4,138,255 A | 2/1979 | Crivello |
| 4,231,951 A | 11/1980 | Smith et al. |
| 4,250,053 A | 2/1981 | Smith |
| 4,256,828 A | 3/1981 | Smith |
| 4,302,553 A | 11/1981 | Frisch et al. |
| 4,394,403 A | 7/1983 | Smith |
| 5,262,232 A | 11/1993 | Wilfong et al. |
| 5,416,134 A | 5/1995 | Skoglund |
| 5,747,567 A | 5/1998 | Traver et al. |
| 6,294,270 B1 | 9/2001 | Clough |
| 6,423,367 B2 | 7/2002 | Clough |
| 6,489,042 B2 | 12/2002 | Imken et al. |
| 6,908,722 B2 | 6/2005 | Ebata et al. |
| 8,952,097 B2 | 2/2015 | Finter et al. |
| 9,394,464 B2 | 7/2016 | Wiercinski et al. |
| 2004/0127594 A1 | 7/2004 | Yang et al. |
| 2005/0287363 A1 | 12/2005 | Ring et al. |
| 2005/0288437 A1 | 12/2005 | Ring et al. |
| 2006/0270800 A1 | 11/2006 | Teyssie et al. |
| 2007/0275240 A1 | 11/2007 | Krawinkel |
| 2010/0063221 A1 | 3/2010 | Manabe et al. |
| 2010/0170636 A1 | 7/2010 | Hanefeld et al. |
| 2011/0039970 A1 | 2/2011 | Dollase et al. |
| 2013/0034736 A1 | 2/2013 | Gössi et al. |
| 2013/0037989 A1 | 2/2013 | Wiercinski et al. |
| 2013/0186562 A1 | 7/2013 | Finter et al. |
| 2013/0284364 A1 | 10/2013 | Couturier et al. |

FOREIGN PATENT DOCUMENTS

| | | |
|---|---|---|
| DE | 10 2004 031 188 A1 | 1/2006 |
| DE | 10 2004 031 190 A1 | 1/2006 |
| DE | 603 06 961 T2 | 3/2007 |
| EP | 0 542 716 B1 | 6/1997 |
| EP | 0 621 931 B1 | 7/1997 |
| EP | 1 658 319 B1 | 11/2009 |
| EP | 2 160 443 B1 | 10/2010 |
| JP | H11343478 A | 12/1999 |
| JP | 2000290619 A | 10/2000 |
| JP | 2002-080811 A | 3/2002 |
| JP | 2009108144 A | 5/2009 |
| JP | 2010059094 A | 3/2010 |
| WO | 1992/11334 A1 | 7/1992 |
| WO | 2004/009720 A2 | 1/2004 |
| WO | 2004/060946 A1 | 7/2004 |
| WO | 2006/120136 A2 | 11/2006 |
| WO | 2011117398 A1 | 9/2011 |
| WO | 2011117402 A1 | 9/2011 |
| WO | 2011/139692 A1 | 11/2011 |
| WO | 2012/061032 A1 | 5/2012 |

OTHER PUBLICATIONS

English Translation of International Search Report dated Apr. 16, 2014, dated Apr. 25, 2014.
Chinese Office Action corresponding to Chinese Application No. 201480006149.9 dated Aug. 2, 2017.
English translation of Office Action issued in connection with Japanese Application No. 2015-554102, dated Nov. 1, 2017.
English Translation of Taiwanese Office Action corresponding to Taiwanese Application No. 103100125, dated Mar. 15, 2017.
Multi-component Polymers—Principles, Structures and Performances, written and compiled by Guojian WANG, Shanghai Tongji University Press, pp. 7-8, published on Oct. 31, 2013.
Encyclopedia of China—Chemistry, the editorial board for Chemistry of the general editorial board of Encyclopedia of China, Encyclopedia of China Publishing House, pp. 452-453, published on Feb. 28, 1989.
English Translation of Chinese Office Action for Application No. 201480006149.9, dated Apr. 18, 2018.
Bulut et al. "Reactivity of Oxetane Monomers in Photoinitiated Cationic Polymerization", J. Polym. Sci. 2005, Vo., 43, pp. 3205 to 3220.
"Interpenetrating Polymer Networks" in "Encyclopedia of Polymer Science and Engineering", vol. 10, pp. 272 to 311, published online: Mar. 15, 2004, John Wiley & Sons, Inc.
Stefanis et al., "Prediction of Hansen Solubility Parameters with a New Group-Contribution Method", Int. J. Thermophys. 2008, vol. 29, pp. 568 to 585.
D. Philp, J.F. Stoddard, Angew. Chem., 1996, 108, 1242, (cited on p. 12 of the Specification submitted herewith).
M. Rehahn, "Organic/Inorganic Hybrid Polymers", Acta Polym., 1998, vol. 49, pp. 201-224.
Lohmeijer et al "Playing LEGO with Macromolecules Design, Synthesis, and Self-Organization with Metal Complexes", J. Polym. Sci. A Polym. Chem., 2003, 41, pp. 1413-1427.

PRESSURE-SENSITIVE ADHESIVE COMPOUND CONTAINING A CROSS-LINKED NANOPARTICLE NETWORK, METHOD OF PRODUCTION AND USE THEREOF

This application is a divisional of U.S. patent application Ser. No. 16/369,406, filed May 29, 2019, which is a divisional of U.S. patent application Ser. No. 14/648,423, filed May 29, 2015, which is a § 371 national stage of PCT International Application No. PCT/EP2014/050500, filed Jan. 13, 2014, which claims foreign priority benefit under 35 U.S.C. § 119 of Europe Patent Application 13152987.7, filed Jan. 29, 2013, the entire contents of each of which are incorporated herein by reference.

The present invention relates to a pressure-sensitive adhesive comprising a connected nanoparticle network, to methods for producing same, and to the use thereof especially for encapsulating an electronic arrangement.

BACKGROUND OF THE INVENTION

Pressure-sensitive adhesives (PSAs) are used across a host of applications, since they offer many desired characteristic features such as, for example, removability and ease of application. For a more durable and very smooth bond, certain conventional PSAs have a strength which is not necessarily sufficient to assure and maintain their adhesion to certain substrates. On application to certain materials, furthermore, a conventional PSA is possibly not able to withstand exposure to elevated temperatures or high humidity. The application of a PSA, for example, to acrylic sheets and polycarbonate sheets, which are known to "outgas materials" and are difficult to bond, may lead to blistering and delamination.

Curable adhesives (cured by heat or light, for example) are employed in applications where substrates require considerable resistance and high-strength adhesion. Conventional curable adhesives, however, are normally not used as PSAs, and are also not provided in a form which is easy to apply, such as tape, for example.

For optical product applications (glazing systems, for example), curable adhesives are desirable, since they ensure optically clear, strongly adhering laminates (layered substrates, for example).

In order to achieve both strength and easy applicability, hybrid compositions have been developed.

Conventional curable adhesives contain reactive chemical building blocks, such as epoxy adhesives, for example, which contain epoxide groups. On curing, these building blocks are able to connect with one another via the epoxide groups, with the aid of a hardener, and form a stable, three-dimensional network. This network formation is a key cause of the generally high strengths and good adhesive properties of epoxy adhesives on many materials.

Hybrid compositions are notable for the incorporation of further materials into this network structure. Solutions attempted include in particular the production of interpenetrating networks (IPNs) or other multiphase structures.

IPNs are defined as combinations of two polymers in network form, of which at least one has been crosslinked or polymerized in the immediate vicinity of the other (see "Interpenetrating Polymer Networks" in "Encyclopedia of Polymer Science and Engineering", vol. 10, pages 272 to 311, published online: 15 Mar. 2004, DOI: 10.1002/0471440264.pst170, John Wiley & Sons, Inc.).

In this system, each polymer forms a separate network, and the two networks are present alongside one another. The system is therefore a two-phase system. Covalent bonds between them are absent. Such networks with mutual penetration have been produced sequentially (from polymer A and monomer B) or simultaneously (from monomer A and monomer B). Combined preferably are an elastomer and a glass, as for example a polyurethane and a polymethacrylate. Depending on the proportions, the product is a strengthened elastomer or a resin of high impact strength.

The chemical composition of IPN systems may vary very greatly. For their synthesis there are essentially two techniques:

The simultaneous technique involves combining two linear polymers, prepolymers, or monomers of kinds A and B with the respective crosslinking agents in the liquid stage, in other words in bulk, melt, solution, or dispersion, and simultaneously polymerizing or crosslinking them. In this case it is necessary to select substances which do not react with one another.

The sequential technique involves swelling a crosslinked polymer A with a monomer of kind B and then polymerizing or crosslinking the latter in situ with addition of crosslinking agents.

Between the two polymer constituents in IPNs there are essentially no bonds and more particularly no covalent bonds.

A distinction is made between semi-interpenetrating networks and fully interpenetrating networks. The methods described above lead to fully interpenetrating networks.

A semi-interpenetrating network is the combination of a linear noncrosslinked polymer with a first crosslinked polymer, the first crosslinked polymer being synthesized in the presence of the other. The noncrosslinked polymer penetrates the network of the crosslinked polymer, and has the effect that the two components are virtually inseparable physically because of interhooking and interlooping. This semi-interpenetrating network allows a combination of properties of two polymers, even when they are thermodynamically incompatible.

IPN systems are examples of polymer mixtures where there is no macroscopic phase separation.

The mixing of polymers normally results in multiphase systems, this being attributable to the well-known thermodynamic incompatibility of the majority of polymers. This incompatibility results from the relatively low entropy gain on the mixing of polymers, which derives in turn from the fact that the great length of the chains limits their possibilities for contact. Where, however, products of lower molecular weight are mixed and then simultaneously polymerized and crosslinked, it is possible to achieve kinetic control of the phase separation.

In IPN systems synthesized to date there is a differing extent of phase separation, depending primarily on the compatibility of the polymers.

In the case of particularly incompatible polymers, the predominance of the thermodynamically induced phase separation is such that it has substantially occurred even before it can be prevented by the kinetically induced changes (that is, the crosslinking). In these cases, the intermixing of the phases is minimal.

If the polymers are more compatible, phase separation can be almost completely circumvented. It must be borne in mind here that complete compatibility (which occurs extremely rarely) is unnecessary for complete phase mixing, in other words mutual penetration, since the "permanent" coiling that is brought about by mutual penetration prevents phase separation. In the case of moderate compatibilities, the phase behavior (the resulting morphology) becomes complex; intermediate stages are the result.

Accordingly, there are IPN systems with domains of dispersed phases that range from a few micrometers through several hundred angstroms, and systems having domain structures which can no longer be resolved (complete mixing). It is for this reason that IPNs with little phase separation generally have only one glass transition temperature.

Relative to customary polymer blends, interpenetrating networks are notable for better resistance toward separation, and often advantageous mechanical properties. The degradation resistance of the interpenetrating networks is commonly better than that of copolymers in which the incompatible polymers are connected to one another covalently in the form of blocks. For this reason IPNs are also used in the field of adhesives, as described in U.S. Pat. No. 4,302,553 A, for example.

There are epoxy resin adhesives known which additionally contain another kind of building blocks, which are able to form an independent network via a second chemical mechanism and which are unable to react with the epoxide-containing building blocks. The curing of these adhesives, accordingly, produces two adhesive networks which are independent of one another and which exhibit mutual penetration, these being IPNs. Viewed in practical terms, such systems consist of two adhesives in one system, the properties of these adhesives ideally complementing one another synergistically.

The miscibility of epoxy resins with other polymers is generally poor. If mixing is nevertheless attempted, polymers tend in general toward separation of the phases used. If success is nevertheless achieved in mixing the noncrosslinked or unpolymerized building blocks of the polymers, themselves, and then carrying out polymerization of these blocks in such a way that phase separation of the polymers formed is prevented, synergy effects may be observed in the resulting polymer mixture. The values which arise for properties such as the bond strength or impact strength are often significantly greater than for the individual networks investigated separately (pure epoxy adhesives, for example).

The effect of the technology of the IPN modification of adhesives therefore lies in the utilization of synergy effects which are exhibited only in the combination of two networks but which cannot be observed in the individual networks. The result of this is frequently a maximization of desired properties and a possible minimization of unwanted properties.

IPNs are also known from the field of the pressure-sensitive adhesives.

EP 0 621 931 B1 (DE 692 21 324 T2) describes hybrid adhesives which are prepared from acrylate monomers and epoxide monomers and which therefore form a simultaneous IPN. A PSA can be obtained only if the reaction comes to a halt before full curing has taken place (B-stage). In this stage, the PSA film must generally be stored with cooling. The components in the mixture are not very compatible with one another, and the resulting films of adhesive are often opaque after curing, suggesting the formation of relatively large domains (examples 9 to 12).

WO 2004/060946 A1 (DE 603 06 961 T2) describes an adhesive composition which comprises an acrylate copolymer, acrylated oligomers, and an initiator which kicks off the radical polymerization. A semi-IPN is formed, which leads to a highly transparent adhesive and points to low phase separation. A prerequisite for this is good compatibility between the components. This compatibility is achieved through the combination of acrylate copolymers with acrylate oligomers. A disadvantage here is that similar classes of compound are combined with one another in this case, meaning that the spectrum of attainable synergistic effects is lower than in the case of different classes of compound.

U.S. Pat. No. 5,747,567 A discloses semi-IPNs by mixing of PSAs based on natural and synthetic rubbers and also acrylates with the components of a silicone-based PSA (silicone resins, MQ resins, for example, and silicone fluids), the latter crosslinking in the presence of the former, by means of a condensation reaction, to form a silicone PSA. Although the possibility of preparing such IPNs from solution or emulsion is stated, the examples disclose only mixing at the emulsion level. Since discrete phases which already exist are mixed with one another here, the system is one of a highly phase-separated semi-IPN of two viscoelastic phases.

WO 2012/061032 A1 discloses adhesives where a reactive isocyanate prepolymer has been dispersed in a styrene block copolymer PSA, this prepolymer forming a semi-IPN within the PSA phase following crosslinking by means of atmospheric moisture. The proportion of the reactive resin here is between about 40 to 70 wt % of the PSA. While there is a reference to the possibility of the formation of complete IPNs, blends, or a reinforcing phase (claim 1), the examples in fact only evidence the formation of semi-IPNs ([0038]). A disadvantage of these PSAs is that they must be stored away from moisture. Although other reactive resins are mentioned, there is no teaching disclosed with regard to further favorable combinations.

EP 1 658 319 B1 encompasses a molding composition comprising a mixture of interpenetrating polymers with a first phase of a crosslinked isobutene polymer and a second phase of a stiffening polymer that comprises (meth)acrylic and/or vinylaromatic units, the first phase comprising the reaction product of an isobutene polymer having on average at least 1,4 functional groups in the molecule and of a crosslinking agent having on average at least two functional groups in the molecule, which have complementary functionality to the functional groups of the isobutene polymer. The IPN here may be produced simultaneously or sequentially—with the crosslinked isobutene phase as the provided network. No pressure-sensitive adhesive molding compositions are disclosed in the examples.

In order to improve the compatibility of the first phase with the second phase, the accompanying use of polymeric compatibilizers is proposed, polyethylene glycol for example. The polymeric compatibilizers are preferably crosslinked. In this way, the polymeric compatibilizer is able to form a network that penetrates the first phase. A disadvantage of this kind of compatibilizing is the high complexity of the now ternary system, making the control of the properties more difficult.

EP 2 160 443 B1 discloses a semi-interpenetrating network having a first phase of a linear noncrosslinked isobutene polymer and a second phase of a crosslinked polymer, the crosslinked polymer being obtained by crosslinking buildup reaction in the presence of the isobutene polymer. In the preferred version, evidenced with examples, the crosslinked polymer is obtained by radical polymerization of ethylenically unsaturated monomers, more particularly of styrene and methacrylates.

The semi-interpenetrating networks obtained, with a weight ratio of PIB/monomer phase of 70/30 up to 50/50, exhibit predominantly two mechanical relaxations at −50° C. and above room temperature, which are characteristic of PIB and of the respective second polymer. This is an indication of the presence of discrete polymer phases. Phase separation is predominantly very strong, meaning that the materials obtained are white due to light scattering.

Preferably, in accordance with this specification, monomers and monomer mixtures are used which produce a polymer or copolymer having a solubility parameter which differs from that of the isobutene polymer by less than 1 $MPa^{1/2}$, preferably less than 0.7 $MPa^{1/2}$, more particularly less than 0.5 $MPa^{1/2}$. In the case of a small difference between the solubility parameters of the isobutene polymer and of the crosslinked polymer, the mutual compatibility of the polymers is high and the extractable fraction of the network is small. From this standpoint, styrene (polyisobutene–polystyrene solubility parameter difference=0.31 $MPa^{1/2}$) and cyclohexyl methacrylate (polycyclohexyl methacrylate–polystyrene solubility parameter difference=0.20 $MPa^{1/2}$) are particularly preferred.

The nature of the buildup reaction is not seen as critical. It may, for example, involve a chain-growth addition polymerization of ethylenically unsaturated monomers, which may be catalyzed radically, anionically, or cationically, or a polyaddition or a polycondensation. Radical polymerization, however, is preferred.

The buildup and the chemical nature of the crosslinked polymer are likewise not considered to be critical, provided the polymer can be prepared from precursors which are at least partly miscible with the isobutene polymer. No technical solution is disclosed for the case where there is no adequate miscibility.

Where the formulations are used as an adhesive, EP 2 160 443 B1 discloses the incidence of a certain phase separation prior to the buildup reaction, causing isobutene polymer to emerge at the external surfaces. Although this does achieve better wetting, this boundary layer penetrated by the buildup constituent no longer weakens the bonding performance later on (weak boundary layer). For adhesive tapes, therefore, compositions of this kind which tend toward phase separation are unsuitable.

Another route to the production of multiphase morphologies is the in situ generation of, for example, nanoparticulate fillers within a polymer phase or during the polymerization. In this case the particles of filler may be organic, more particularly polymeric, inorganic, or hybrid in nature (for example, inorganic-organic hybrid materials from a sol-gel process). Complex multiphase polymer-polymer morphologies generated in situ are also known, an example being high-impact polystyrene (HIPS), wherein the rubber domains encased in one another are obtained by free radical polymerization of styrene-polybutadiene solutions with continuous stirring. Here, generally, the material with the smaller proportion on a volume basis is present as a disperse phase within the material having the larger fraction.

One common method for generating two-phase morphologies for example in epoxy resin adhesives is the addition of an endgroup-modified, epoxide-reactive polybutadiene-co-acrylonitrile copolymer to the uncured epoxy resin. The thermoplastic polymer in this case must be soluble in the uncured epoxy resin, but in the course of the curing reaction must be incompatible with the epoxy resin polymer, resulting in phase separation during the curing procedure. When the gel point is reached, the phase separation process is halted, giving the thermoplastic or elastomeric polymer in the form of microscopic spherical domains in the epoxy resin matrix.

Likewise known in the PSA field are microphase-separated systems. They include, for example, PSAs based on styrene block copolymers, where domains of polystyrene form after solidification from a melt or after the evaporation of solvent, and endow the PSA with increased cohesion by virtue of their glass transition temperature above room temperature. This is often also called "physical crosslinking" (see DE 103 61 540 A1).

Also known is the incorporation into such PSAs of reactive resins which are caused to crosslink after the application of the PSA.

DE 10 2004 031 188 A1 and DE 103 61 540 A1 disclose adhesives which consist at least of a) an acid-modified or acid anhydride-modified vinylaromatic block copolymer and b) an epoxide-containing compound. As a result of the chemical crosslinking of the resins with the elastomers, very high strengths are achieved within the adhesive film. Because of the crosslinking, then, these are not IPNs. In order to increase the adhesion, the addition of tackifier resins compatible with the elastomer block of the block copolymers is also possible. The acid-modified and/or acid anhydride-modified elastomers and epoxy resins are used in a proportion such that the molar fraction of epoxide groups and anhydride groups is just equivalent. When the common elastomers with only low levels of modification and low molecular mass epoxy resins having a low epoxide equivalent are used, the result is only very small amounts—of below 10 wt %, based on the modified styrene block copolymer—of epoxy resin used. In this way, essentially, the epoxy resin acts as a crosslinking agent for the modified elastomers, and forms its own second phase to a small extent at best.

U.S. Pat. Nos. 6,294,270 B, 6,423,367 B, and 6,489,042 B describe crosslinkable mixtures of epoxidized vinylaromatic block copolymers and epoxy resins, one of the stated applications being an adhesive for the bonding of two electronic components. In view of the crosslinking, therefore, these systems are not IPNs. Described primarily is crosslinking by irradiation with UV light. For this purpose, a very high proportion of more than 90 wt % of the epoxidized vinylaromatic block copolymer has proven the ideal solution here. Essentially, the epoxy resin here as well acts as a crosslinking agent for the modified elastomers, and forms its own second phase to a small extent, if at all.

The teaching of these (five) aforementioned specifications suggests to the skilled person that there must in each case be a homogeneous blend of reactive resin and modified block copolymer, notable for high compatibility of these at least two components. As a result of the advantageous low amount of reactive resin, the danger of incompatibility and hence formation of phases is lessened even after the crosslinking of the reactive resin.

DE 10 2004 031 190 A1 discloses an adhesive at least of a) an epoxide-modified vinylaromatic block copolymer, b) an epoxy resin, and c) a hardener which executes crosslinking with the epoxide groups at high temperatures, the ratio of a) to b) lying between 40:60 and 80:20. The chemical crosslinking of the resin with the elastomer results in very high strengths being achieved within the adhesive film. Because of the crosslinking, therefore, the system is not an IPN. In order to raise the adhesion, the addition of tackifier resins compatible with the elastomer block of the block copolymers is also possible. If elastomers are used which are not chemically crosslinkable, the bond strengths, as shown in the comparative example, are much lower than in those with crosslinking possibility.

SUMMARY OF THE INVENTION

Multiphase PSAs also include, in particular, those PSAs in which fillers are bonded covalently to components of the PSA, more particularly to the base polymer (see WO 2006/120136 A1). The fillers advantageously are nanoscale. A disadvantage of this solution is the difficulty of dispersing the nanoscale fillers in the matrix homogeneously and without the formation of agglomerates.

There is therefore an ongoing requirement for solutions for providing PSAs having specifically adjusted adhesion and cohesion properties.

It is an object of the present invention, accordingly, to provide a PSA which comprises an IPN and is therefore able to utilize the advantages of this technology, but which avoids disadvantages of the prior art, such as deficient transparency in particular. There is also demand for a method for reliably producing such PSAs and for overcoming hurdles, such as the deficient compatibility of the polymer constituents, for example, and hence a small portfolio in the selection of the polymer constituents.

This object is achieved by means of a PSA as characterized more closely in the main claim. The dependent claims describe advantageous embodiments of the invention. Further encompassed by the inventive concept are uses of the PSA of the invention, and also production methods.

The invention relates accordingly to a pressure-sensitive adhesive comprising at least two constituents, each forming a phase, from which an IPN having at least two phases is formed by buildup reaction, more particularly crosslinking buildup reaction, the first phase (elastomer phase) having at least a DSC softening temperature of less than 23° C. and the second phase after the buildup reaction having a DSC softening temperature of greater than 23° C., and the second phase after the buildup reaction having the morphology of a connected nanoparticle network.

DETAILED DESCRIPTION

Figure 1:
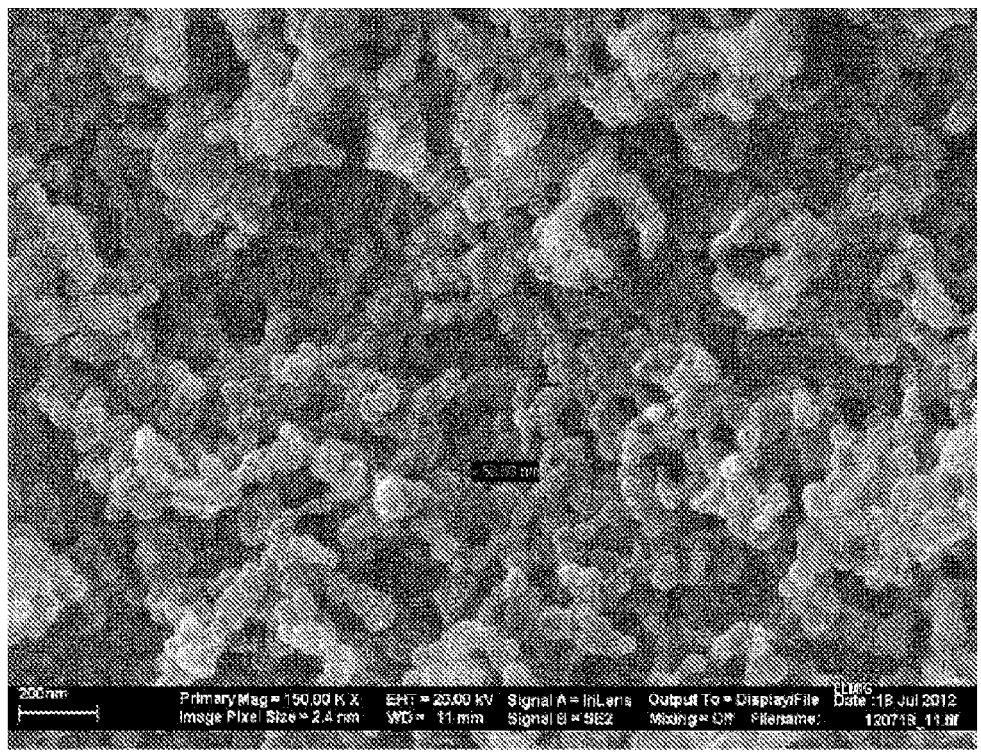
FIG. 1 is a scanning electron micrograph of the adhesive film of example 6.

The softening point is understood to be the temperature (or temperature range) at which amorphous or semicrystalline polymers undergo transition from the glassy or semicrystalline, hard-elastic state into a soft state.

The softening temperature of homopolymers, copolymers, hard blocks and soft blocks, and uncured reactive resins is determined calorimetrically by way of Differential Scanning calorimetry (DSC) in accordance with DIN 53765: 1994-03. Heating curves and cooling curves run with a rate of 10 K/min. The specimens are subjected to measurement in Al crucibles with perforated lid under a nitrogen atmosphere. The heating curve evaluated is the second heating curve. In the case of amorphous substances, the glass transition temperatures which occur are defined as softening temperature; in the case of (semi)crystalline substances, as the melting temperatures. A glass transition can be discerned as a step in the thermogram. The glass transition temperature is evaluated as the middle point of this step. A melting temperature can be discerned as a peak in the thermogram. The melting temperature recorded is that temperature at which the highest exotherm occurs.

The PSA of the invention therefore comprises an IPN which consists of a phase with little or no crosslinking (elastomer phase) and of a highly crosslinked phase (hard phase), the hard phase developing the morphology of a connected nanoparticle network.

The IPN is preferably a semi-IPN in which the first phase, the elastomer phase, is present in a form in which it is not crosslinked, more particularly not covalently crosslinked.

Interloops of molecule chains (entanglements) are not considered to be crosslinking in the sense of the invention, with one exception: in the sense of the invention, the definition is that crosslinking via multiple chain entanglements, resulting from the weight average $M_w$ of the first phase (elastomer phase) corresponding to at least 5 times, preferably 25 times, the entanglement molecular weight is regarded as a variant of physical crosslinking.

Although rubbers as well may be chemically crosslinked, they can also be employed without additional crosslinking provided their molar masses are high enough (which is the case for many natural and synthetic systems). The desired elastic properties in long-chain rubbers result from the entanglements, or the entanglement molar masses, which are polymer-characteristic (with regard to the concept and for a series of polymers, see L. J. Fetters et al., *Macromolecules,* 1994, 27, pages 4639 to 4647).

The elastomer phase is preferably physical (for example through formation of domains in the case of block copolymers) or coordinative.

Examples of coordinative bonds are ligand-central atom bonds in complexes, in other words the formation of a coordinative bond with metal atoms, which may be present in elemental form, in the form of metal salts and/or in the form of metal complexes, and also all other donor-acceptor bonds [in this regard, see, for example, D. Philp, J. F. Stoddard, *Angew. Chem.,* 1996, 108, 1242; M. Rehahn, *Acta Polym.,* 1998, 49, 201; B. G. G. Lohmeijer, U.S. Schubert, *J. Polym. Sci. A Polym. Chem.,* 2003, 41, 1413, and literature cited in each of the foregoing].

An example is the coordination of acid groups to metal chelates.

A PSA of this kind is obtained by a method for producing a connected nanoparticle network, characterized by the following steps:

1. producing a preferably homogeneous mixture of at least one elastomer, at least one reactive component (reactive resin/monomer), and optionally a tackifier resin, in which the mass fraction of the reactive component is less than or equal to (not greater than) the sum of the elastomer and of the optional tackifier resin
2. initiating the buildup reaction of the reactive resin/monomer, disperse nanoparticles being built up from the reactive resin/monomer and connecting to one another to form a network of nanoparticles within the elastomer phase.

The buildup reaction may be a crosslinking reaction, a chain-growth addition polymerization, or a one-, two-, or three-dimensional chain growth reaction.

The steps may also take place simultaneously to one another, especially the buildup of the nanoparticles and also the simultaneous connecting thereof during the buildup.

Steps 1 and 2 may proceed simultaneously if, for example, the reaction is commenced with the mixing-together of the components.

Surprisingly it has been found that where a connected network of this kind is present, the reinforcing properties of an extensively branched or even continuous hard phase (second phase) come to bear, and the high transparency of the PSA is also maintained.

A surprising moment found is that with regard to the production of PSAs on the basis of IPNs, the following possibilities arise for the skilled person:

1. In the buildup of the IPNs there is no phase separation, which occurs only when the constituents are very highly compatible with one another under the prevailing reaction conditions. As already elucidated above, this scenario is very rare. Where the aim is for adhesives based on such IPNs, there is only a very small selection of possible combinations of constituents, and hence only few possibilities for variation in the formulation of such adhesives.
2. The selection of the constituents and reaction conditions is made so as to form disperse, often spherical domains of the hard phase within the elastomer phase. The size of these phases may be such that they do or do not scatter the light under the prevailing refractive-index differences. Accordingly, transparent or nontransparent adhesives can be achieved. For the skilled person, however, this phase development is less preferred, since the reinforcing effect of the hard phase can be compared essentially with that of fillers, such as of nanoparticulate fillers, for example, and does not have any advantage relative to these fillers.
3. Accordingly, if a IPN is not achievable as under 1, the skilled person would at least aim for co-continuous development of the hard phase with the elastomer phase, allowing the hard phase to develop a pronounced reinforcing effect within the elastomer. For the development of a morphology of this kind, however, a sufficiently large volume fraction of the hard phase is necessary, which the skilled person would initially estimate roughly at 50 vol %. With this large amount of hard phase increased instances of incompatibility are likely, even in the case of reactive resins/monomers which are compatible in small amounts, and so the co-continuous morphology is developed in a fairly coarse way (that is, at scales of length of the interencased cells in the region above 100 nm), with the consequence that nontransparent adhesives are expected unless the refractive index of the constituents is not very similar. EP 2 160 443 B1 describes the adaptation of the refractive index as a proven measure for the production of transparency in such systems. If this measure cannot be realized, the skilled person would aim to develop the co-continuous structure as finely as possible.

With the surprisingly found structure of the connected nanoparticle network, these hurdles in the development even of transparent PSAs which comprise an IPN can be overcome.

The buildup from nanoparticles avoids the development of the coarse-scale co-continuous structure, since the co-continuous structure is constructed from nanoscale structural elements. Moreover, a co-continuous structure of this kind can be obtained even with a lower volume fraction of the hard phase than in the case of a conventional phase separation. The connected nanoparticle network is present ideally in the form of a string-of-pearls structure (as is known, for example, for aerogels), but may also be marked by other forms.

PSAs are adhesives which permit a durable join to the substrate even under relatively weak applied pressure and which after use can be detached from the substrate again substantially without residue. At room temperature, PSAs have a permanently pressure-sensitively adhesive effect, hence having a sufficiently low viscosity and a high initial tack, allowing them to wet the surface of the respective substrate even under low applied pressure. The bondability of such adhesives derives from their adhesive properties, and the redetachability from their cohesive properties. A variety of materials are suitable as a basis for PSAs.

PSAs which can be used are all PSAs known to the skilled person, in other words, for example, those based on acrylates and/or methacrylates, polyurethanes, natural rubbers, synthetic rubbers, styrene block copolymer compositions with an elastomer block composed of unsaturated or hydrogenated polydiene blocks (polybutadiene, polyisoprene, copolymers of both, and also other elastomer blocks familiar to the skilled person), polyolefins, fluoropolymers and/or silicones. They also include further compositions which possess pressure-sensitively adhesive properties in accordance with the "Handbook of Pressure Sensitive Adhesive Technology" by Donatas Satas (Satas & Associates, Warwick 1999), especially those which meet the Dahlquist criterion.

Where this specification refers to acrylate-based PSAs, the reference, even without explicit mention, is to PSAs based on methacrylates and based on copolymers consisting of acrylates and methacrylates, unless expressly described otherwise. Likewise within the sense of the invention are combinations and blends of two or more base polymers, and also adhesives additized with tackifier resins, fillers, aging inhibitors, and crosslinkers, where the enumeration of the additives should be understood as only by way of example and without restriction.

As elastomer phase it is possible in principle to use all elastomers customary within the field of PSAs, as described for example in the "Handbook of Pressure Sensitive Adhesive Technology" by Donatas Satas (Satas & Associates, Warwick 1999).

These are, for example, elastomers based on acrylates and/or methacrylates, polyurethanes, natural rubbers, synthetic rubbers such as butyl, (iso)butyl, nitrile, or butadiene rubbers, styrene block copolymers with an elastomer block composed of unsaturated or partly or fully hydrogenated polydiene blocks (polybutadiene, polyisoprene, poly(iso)butylene, copolymers thereof, and further elastomer blocks familiar to the skilled person), polyolefins, fluoropolymers and/or silicones.

Where rubber or synthetic rubber or blends produced therefrom is/are employed as base material for the PSA, the natural rubber may be selected in principle from all available grades such as, for example, crepe, RSS, ADS, TSR, or CV types, according to required levels of purity and of viscosity, and the synthetic rubber or rubbers may be selected from the group of randomly copolymerized styrene-butadiene rubbers (SBR), butadiene rubbers (BR), synthetic polyisoprenes (IR), butyl rubbers (IIR), halogenated butyl rubbers (XIIR), acrylate rubbers (ACM), ethylene-vinyl acetate copolymers (EVA), or polyurethanes, and/or blends thereof.

According to one preferred embodiment of the invention, these elastomers have a molar mass which is greater than their 5-fold, preferably 25-fold, entanglement molar mass. "Based on" or "on the basis of" means in the present context that the properties of the polymer mixture are determined at least to a large extent by the fundamental properties of this polymer (the so-called base polymer), without, of course, ruling out an additional influence on these properties through use of modifying auxiliaries or adjuvants, or of further polymers, in the composition. In particular this may mean that the fraction of the base polymer in the overall mass of the elastomeric phase is more than 50 wt %.

The polymer may be linear, branched, star-shaped, or grafted in structure, to give but a few examples, and may be constructed as a homopolymer, as a random copolymer, as an alternating, or as a block copolymer. The designation "random copolymer" in the context of this invention entails not only those copolymers in which the comonomers used in the polymerization are incorporated purely randomly, but also those in which there are gradients in the comonomer composition and/or local accumulations of individual comonomer kinds in the polymer chains. Individual polymer blocks may be built up as a copolymer block (random or alternating).

Preference is given to using elastomer phases based on block copolymers, more particularly vinylaromatic block copolymers.

On the one hand, the vinylaromatic block is an agent for physical crosslinking through the formation of domains of the PSA, and on the other hand the vinylaromatic blocks may act as compatibilizers for the reactive component, so facilitating the production of a homogeneous mixture. Block copolymers with a soft acrylate block as well are particularly suitable, though.

The hard phase of the interpenetrating network of the invention is formed by a polymer, more particularly a crosslinked polymer, whose softening point is greater than 23° C. The polymer, more particularly crosslinked polymer, is obtained preferably by crosslinking buildup reaction in the presence of the elastomer phase (sequential IPN). A crosslinking buildup reaction is a reaction in which branches and/or crosslinks into the growing polymer chains are incorporated in parallel to the buildup of a macromolecule from reactive components (monomeric and/or oligomeric constituents).

As reactive component it is possible in principle to use all reactive constituents known to the skilled person in the field of PSAs or reactive adhesives and forming crosslinking macromolecules in a buildup reaction, these constituents being as described for example in Gerd Habenicht: Kleben-Grundlagen, Technologien, Anwendungen, 6th edition, Springer, 2009. Examples are constituents which form epoxides, polyesters, polyethers, polyurethanes, phenolic resin-based, cresol based, or novolak based polymers, polysulfides, or acrylic polymers (acrylic, methacrylic).

The buildup and the chemical nature of the hard phase are not critical, provided they can be produced from precursors which are at least partly miscible with the elastomer phase, and provided the buildup reaction can be carried out under conditions, more particularly in terms of the temperatures employed, nature of catalysts used, and the like, that do not lead to any substantial impairment and/or decomposition of the elastomer phase.

The mass ratio of elastomer phase to hard phase can be from 85:15 up to 50:50. In the case of a hard-phase fraction of more than 50 wt %, in general the development of the structure of the invention, in other words a co-continuous structure formed by connected particles, is no longer observed; in general a known co-continuous structure is produced, in other words a homogeneous co-continuous structure not formed by connected particles, or there is even a phase inversion, so that the hard phase is the matrix in which the elastomer phase is dispersed.

Preferred in accordance with the invention, therefore, is a hard-phase fraction of less than/equal to 50 wt %, since otherwise the PSA becomes too soft, meaning that it is no longer advantageous over liquid adhesives in terms of its manageability in its uncured state.

A hard-phase fraction of greater than/equal to 15 wt % is preferred, since otherwise the hard phase frequently adopts a disperse morphology.

Preference is given to a mass ratio of elastomer phase to hard phase of 80:20 up to 60:40, since within this range it is possible to achieve PSAs which exhibit an increase in cohesion that is sufficient for the technical application, as a result of the structure of the invention obtained by means of the buildup reaction, but without becoming brittle.

Preference is given to a mass ratio of elastomer phase to hard phase of 85:15 up to 80:20, since within this range it is possible to achieve PSAs which in the uncured state, in other words before the buildup reaction has taken place, exhibit sufficient storage stability on the roll (no substantial outflow at the edges).

Preference is given to a further mass ratio of elastomer phase to hard phase of 85:15 up to 65:35, more particularly from 80:20 up to 70:30, since within this range it is possible to achieve PSAs which exhibit a good compromise between flowability in the state before the buildup reaction, and cohesion in the structure of the invention.

Preferred embodiments of the invention are set out hereinafter.

The buildup of the hard phase is accomplished preferably via reaction mechanisms (which can be designated slow) in which the lifetime of the reactive species is >1 s, more preferably >1 min. This is true especially of cationic and controlled radical polymerizations, in which the number of linked monomers in the polymer formed is time-dependent. This is not the case for free radical polymerizations.

The buildup reaction is accomplished preferably cationically or by means of a controlled radical mechanism (for example, RAFT, ATRP, NMRP). With these types of reaction, the number of reaction nuclei and hence the number and size of the particles can be determined via the amount of initiator or of chain transfer agent, since particles grow only from these nuclei. In the case of free radical polymerization, the number of particles is dependent on factors including the number of chain transfer reactions, and is therefore relatively uncontrollable.

Where block copolymers are employed as elastomers, they include at least one kind of block having a softening temperature of greater than 40° C., such as, for example, vinylaromatics (including partly or fully hydrogenated versions), methyl methacrylate, cyclohexyl methacrylate, isobornyl methacrylate, and isobornyl acrylate.

With further preference the block copolymer includes one kind of block having a softening temperature of less than −20° C.

Examples of polymer blocks with low softening temperatures ("soft blocks") are polyethers such as, for example, polyethylene glycol, polypropylene glycol, or polytetrahydrofuran, polydienes such as, for example, polybutadiene or polyisoprene, (partly) hydrogenated polydienes such as, for example, polyethylenebutylene, polyethylenepropylene, or polybutylenebutadiene, polybutylene, polyisobutylene, polyalkyl vinyl ethers, polymer blocks of α,β-unsaturated esters, such as acrylate copolymers in particular.

In one embodiment here, the soft block is of apolar construction and in that case comprises preferably butylene or isobutylene or hydrogenated polydienes as homopolymer block or copolymer block, the latter preferably copolymerized with itself or with one another or with further comonomers, which with particular preference are apolar comonomers. Examples of suitable apolar comonomers are (partly) hydrogenated polybutadiene, (partly) hydrogenated polyisoprene and/or polyolefins.

According to one preferred embodiment, the PSA of the invention comprises at least one kind of a reactive resin based on a cyclic ether for radiation crosslinking and optionally thermal crosslinking, with a softening temperature of less than 40° C., preferably of less than 20° C.

The reactive resins based on cyclic ethers are, in particular, epoxides, in other words, compounds which carry at least one oxirane group, or oxetanes. They may be aromatic or, more particularly, aliphatic or cycloaliphatic in nature.

Reactive resins which can be used may be monofunctional, difunctional, trifunctional, tetrafunctional, or more highly functional through polyfunctional in architecture, with the functionality relating to the cyclic ether group.

Examples, without any intention to impose a restriction, are 3,4-epoxycyclohexylmethyl 3',4'-epoxycyclohexanecarboxylate (EEC) and derivatives, dicyclopentadiene dioxide and derivatives, 3-ethyl-3-oxetanemethanol and derivatives, diglycidyl tetrahydrophthalate and derivatives, diglycidyl hexahydrophthalate and derivatives, 1,2-ethane diglycidyl ether and derivatives, 1,3-propane diglycidyl ether and derivatives, 1,4-butanediol diglycidyl ether and derivatives, higher 1,n-alkane diglycidyl ethers and derivatives, bis[(3,4-epoxycyclohexyl)methyl] adipate and derivatives, vinylcyclohexyl dioxide and derivatives, 1,4-cyclohexanedimethanol bis(3,4-epoxycyclohexanecarboxylate) and derivatives, diglycidyl 4,5-epoxytetrahydrophthalate and derivatives, bis[1-ethyl(3-oxetanyl)methyl] ether and derivatives, pentaerythrityl tetraglycidyl ether and derivatives, bisphenol A diglycidyl ether (DGEBA), hydrogenated bisphenol A diglycidyl ether, bisphenol F diglycidyl ether, hydrogenated bisphenol F diglycidyl ether, epoxyphenol novolaks, hydrogenated epoxyphenol novolaks, epoxycresol novolaks, hydrogenated epoxycresol novolaks, 2-(7-oxabicyclo;spiro[1,3-dioxane-5,3'-[7]-oxabicyclo[4.1.0]heptane)], 1,4-bis((2,3-epoxypropoxy)methyl)cyclohexane.

Reactive resins can be used in their monomeric form or else dimeric form, trimeric form, etc., up to and including their oligomeric form.

Mixtures of reactive resins with one another, but also with other coreactive compounds such as alcohols (monofunctional or polyfunctional) or vinyl ethers (monofunctional or polyfunctional), are likewise possible.

The adhesive formulation additionally comprises at least one kind of photoinitiator for the cationic curing of the reactive resins. Among the initiators for cationic UV curing, more particularly, sulfonium-, iodonium- and metallocene-based systems are usable.

As examples of sulfonium-based cations, reference is made to the details in U.S. Pat. No. 6,908,722 B1 (especially columns 10 to 21).

Examples of anions which serve as counterions to the abovementioned cations include tetrafluoroborate, tetraphenylborate, hexafluorophosphate, perchlorate, tetrachloroferrate, hexafluoroarsenate, hexafluoroantimonate, pentafluorohydroxyantimonate, hexachloroantimonate, tetrakispentafluorophenylborate, tetrakis(pentafluoromethylphenyl)borate, bi(trifluoromethylsulfonyl)amides and tris(trifluoromethylsulfonyl)methides. Additionally conceivable as anions, especially for iodonium-based initiators, are also chloride, bromide or iodide, although preference is given to initiators essentially free of chlorine and bromine.

More specifically, the usable systems include
sulfonium salts (see, for example, U.S. Pat. Nos. 4,231,951 A, 4,256,828 A, 4,058,401 A, 4,138,255 A and US 2010/063221 A1) such as triphenylsulfonium hexafluoroarsenate, triphenylsulfonium hexafluoroborate, triphenylsulfonium tetrafluoroborate, triphenylsulfonium tetrakis(pentafluorobenzyl)borate, methyldiphenylsulfonium tetrafluoroborate, methyldiphenylsulfonium tetrakis(pentafluorobenzyl)borate, dimethylphenylsulfonium hexafluorophosphate, triphenylsulfonium hexafluorophosphate, triphenylsulfonium hexafluoroantimonate, diphenylnaphthylsulfonium hexafluoroarsenate, tritolylsulfonium hexafluorophosphate, anisyldiphenylsulfonium hexafluoroantimonate, 4-butoxyphenyldiphenylsulfonium tetrafluoroborate, 4-butoxyphenyldiphenylsulfonium tetrakis(pentafluorobenzyl)borate, 4-chlorophenyldiphenylsulfonium hexafluoroantimonate, tris(4-phenoxyphenyl)-sulfonium hexafluorophosphate, di(4-ethoxyphenyl)methylsulfonium hexafluoroarsenate, 4-acetylphenyldiphenylsulfonium tetrafluoroborate, 4-acetylphenyldiphenylsulfonium tetrakis(pentafluorobenzyl)borate, tris(4-thiomethoxyphenyl)sulfonium hexafluorophosphate, di(methoxysulfonylphenyl)-methylsulfonium hexafluoroantimonate, di(methoxynaphthyl)methylsulfonium tetrafluoroborate, di(methoxynaphthyl)methylsulfonium tetrakis(pentafluorobenzyl)-borate, di(carbomethoxyphenyl) methylsulfonium hexafluorophosphate, (4-octyloxyphenyl)diphenylsulfonium tetrakis(3,5-bis(trifluoromethyl)phenyl)borate, tris[4-(4-acetylphenyl)thiophenyl]sulfonium tetrakis(pentafluorophenyl)borate, tris(dodecylphenyl)sulfonium tetrakis(3,5-bis(trifluoromethyl)phenyl)borate, 4-acetamidophenyldiphenylsulfonium tetrafluoroborate, 4-acetamidophenyldiphenyl-sulfonium tetrakis(pentafluorobenzyl)borate, dimethylnaphthylsulfonium hexafluorophosphate, trifluoromethyldiphenylsulfonium tetrafluoroborate, trifluoromethyldiphenylsulfonium tetrakis(pentafluorobenzyl)borate, phenylmethylbenzylsulfoniurn hexafluorophosphate, 5-methylthianthrenium hexafluorophosphate, 10-phenyl-9,9-dimethylthioxanthenium hexafluorophosphate, 10-phenyl-9-oxothioxanthenium tetrafluoroborate, 10-phenyl-9-oxothioxantheniurn tetrakis(penta-fluorobenzyl)borate, 5-methyl-10-oxothianthrenium tetrafluoroborate, 5-methyl-10-oxothianthrenium tetrakis(pentafluorobenzyl)borate and 5-methyl-10,10-dioxothianthrenium hexafluorophosphate, iodonium salts (see, for example, U.S. Pat. Nos. 3,729,313 A, 3,741,769 A, 4,250,053 A, 4,394,403 A and US 2010/063221 A1) such as diphenyliodonium tetrafluoroborate, di(4-methylphenyl)iodonium tetrafluoroborate, phenyl-4-methylphenyliodonium tetrafluoroborate, di(4-chlorophenyl)iodonium hexafluorophosphate, dinaphthyliodonium tetrafluoroborate, di(4-trifluoromethylphenyl)iodonium tetrafluoroborate, diphenyliodonium hexafluorophosphate, di(4-methylphenyl)iodonium hexafluorophosphate, diphenyliodonium hexafluoroarsenate, di(4-phenoxyphenyl)iodonium tetrafluoroborate, phenyl-2-thienyliodonium hexafluorophosphate, 3,5-dimethylpyrazolyl-4-phenyliodonium hexafluorophosphate, diphenyliodonium hexafluoroantimonate, 2,2'-diphenyliodonium tetrafluoroborate, di(2,4-dichlorophenyl) iodonium hexafluorophosphate, di(4-bromophenyl)iodonium hexafluorophosphate, di(4-methoxyphenyl)iodonium hexafluorophosphate, di(3-carboxyphenyl)iodonium hexafluorophosphate, di(3-methoxycarbonyl phenyl) iodonium hexafluorophosphate, di(3-methoxysulfonylphenyl)-iodonium hexafluorophosphate, di(4-acetamidophenyl) iodonium hexafluorophosphate, di(2-benzothienyl)iodonium hexafluorophosphate, diaryliodonium tristrifluoromethylsulfonylmethide such as diphenyliodonium hexafluoroantimonate, diaryliodonium tetrakis(pentafluorophenyl)borate such as diphenyliodonium tetrakis-(pentafluorophenyl) borate, (4-n-desiloxyphenyl)phenyliodonium hexafluoroantimonate, [4-(2-hydroxy-n-tetradesiloxy) phenyl]phenyliodonium hexafluoroantimonate, [4-(2-hydroxy-n-tetradesiloxy)phenyl]phenyliodonium trifluorosulfonate, [4-(2-hydroxy-n-tetradesiloxy)phenyl] phenyliodonium hexafluorophosphate, [4-(2-hydroxy-n-tetradesiloxy)phenyl]phenyliodonium tetrakis (pentafluorophenyl)borate, bis(4-tert-butyl phenyl) iodonium hexafluoroantimonate, bis(4-tert-butylphenyl)iodonium hexafluorophosphate, bis(4-tert-butylphenyl)iodonium trifluorosulfonate, bis(4-tert-butyl phenyl) iodonium tetrafluoroborate, bis (dodecylphenyl) iodonium hexafluoroantimonate, bis (dodecylphenyl)iodonium tetrafluoroborate, bis (dodecylphenyl)iodonium hexafluorophosphate, bis (dodecylphenyl)iodonium trifluoromethylsulfonate, di(dodecylphenyl)iodonium hexafluoroantimonate, di(dodecylphenyl)iodonium triflate, diphenyliodonium bisulfate, 4,4'-dichlorodiphenyliodonium bisulfate, 4,4'-dibromodiphenyliodonium bisulfate, 3,3'-dinitrodiphenyliodonium bisulfate, 4,4'-dimethyldiphenyliodonium bisulfate, 4,4'-bis(succinimidodiphenyl)iodonium bisulfate, 3-nitrodiphenyliodonium bisulfate, 4,4'-dimethoxy-diphenyliodonium bisulfate, bis(dodecylphenyl)iodonium tetrakis(pentafluorophenyl)borate, (4-octyloxyphenyl)phenyliodonium tetrakis(3,5-bis-trifluoromethylphenyl)borate and (tolylcumyl) iodonium tetrakis(pentafluorophenyl)borate, and ferrocenium salts (see, for example, EP 542 716 B1) such as $\eta^5$-(2,4-cyclopentadien-1-yl)-[(1,2,3,4,5,6,9)-(1-methylethyl)benzene]iron.

Examples of commercialized photoinitiators are Cyracure UVI-6990, Cyracure UVI-6992, Cyracure UVI-6974 and Cyracure UVI-6976 from Union Carbide, Optomer SP-55, Optomer SP-150, Optomer SP-151, Optomer SP-170 and Optomer SP-172 from Adeka, San-Aid SI-45L, San-Aid SI-60L, San-Aid SI-80L, San-Aid SI-100L, San-Aid SI-110L, San-Aid SI-150L and San-Aid SI-180L from Sanshin Chemical, SarCat CD-1010, SarCat CD-1011 and SarCat CD-1012 from Sartomer, Degacure K185 from Degussa, Rhodorsil Photoinitiator 2074 from Rhodia, CI-2481, CI-2624, CI-2639, CI-2064, CI-2734, CI-2855, CI-2823 and CI-2758 from Nippon Soda, Omnicat 320, Omnicat 430, Omnicat 432, Omnicat 440, Omnicat 445, Omnicat 550, Omnicat 550 BL and Omnicat 650 from IGM Resins, Daicat II from Daicel, UVAC 1591 from Daicel-Cytec, FFC 509 from 3M, BBI-102, BBI-103, BBI-105, BBI-106, BBI-109, BBI-110, BBI-201, BBI, 301, BI-105, DPI-105, DPI-106, DPI-109, DPI-201, DTS-102, DTS-103, DTS-105, NDS-103, NDS-105, NDS-155, NDS-159, NDS-165, TPS-102, TPS-103, TPS-105, TPS-106, TPS-109, TPS-1000, MDS-103, MDS-105, MDS-109, MDS-205, MPI-103, MPI-105, MPI-106, MPI-109, DS-100, DS-101, MBZ-101, MBZ-201, MBZ-301, NAI-100, NAI-101, NAI-105, NAI-106, NAI-109, NAI-1002, NAI-1003, NAI-1004, NB-101, NB-201, NDI-101, NDI-105, NDI-106, NDI-109, PAI-01, PAI-101, PAI-106, PAI-1001, PI-105, PI-106, PI-109, PYR-100, SI-101, SI-105, SI-106 and SI-109 from Midori Kagaku, Kayacure PCI-204, Kayacure PCI-205, Kayacure PCI-615, Kayacure PCI-625, Kayarad 220 and Kayarad 620, PCI-061T, PCI-062T, PCI-020T, PCI-022T from Nippon Kayaku, TS-01 and TS-91 from Sanwa Chemical, Deuteron UV 1240 from Deuteron, Tego Photocompound 1465N from Evonik, UV 9380 C-D1 from GE Bayer Silicones, FX 512 from Cytec, Silicolease UV Cata 211 from Bluestar Silicones and Irgacure 250, Irgacure 261, Irgacure 270, Irgacure PAG 103, Irgacure PAG 121, Irgacure PAG 203, Irgacure PAG 290, Irgacure CGI 725, Irgacure CGI 1380, Irgacure CGI 1907 and Irgacure GSID 26-1 from BASF.

The skilled person is aware of further systems that can likewise be employed in accordance with the invention. Photoinitiators are employed uncombined or as a combination of two or more photoinitiators.

Advantageous photoinitiators are those which exhibit absorption at less than 350 nm and advantageously at greater than 250 nm. Initiators which absorb above 350 nm, in the violet light range, for example, can likewise be employed. Sulfonium-based photoinitiators are employed with particular preference, since they have advantageous UV absorption characteristics.

In addition, it is possible to employ photosensitizers which reduce the photoinitiator in a redox process. In this process, the actual photoinitiator is broken down, forming reactive cations that can start a cationic polymerization. This method of conducting the reaction allows initiation of the cationic polymerization at higher wavelengths. Examples of such photosensitizers are diphenolmethanone and derivatives, acetophenone derivatives, for example Irgacure 651, anthracene derivatives such as 2-ethyl-9,10-dimethoxyanthracene and 9-hydroxymethylanthracene, phenyl ketone derivatives such as 1-hydroxycyclohexyl phenyl ketone, 2-hydroxy-2-methyl-1-phenylpropan-1-one and 4-(2-hydroxyethoxy)phenyl 2-hydroxy-2-methylpropyl ketone (Irgacure 184, Darocure 1173, Irgacure 2959), and thioxanthenone derivatives such as 4-isopropyl-9-thioxanthenone or 1-chloro-4-propoxythioxanthenone.

Particularly preferred combinations of photoinitiator and sensitizer take into account the different redox potentials and retardation potentials of intermediates, as is the case for combinations of diaryliodonium-based photoinitiators with acetophenone sensitizers, and as described in Bulut U., Crivello J. V., *J. Polym. Sci.* 2005, 43, pages 3205 to 3220.

The combination of styrene block copolymers with the particularly preferred soft blocks and with the preferred reactive resins frequently displays high compatibility in respect of the formation of the homogeneous mixture.

In the case of less-good compatibility, it is advantageous to use a compatibilizer. Preference here is given to using a compatibilizer which is miscible with both components, but which itself does not react with one of the two constituents during the buildup reaction(s) of the IPN. This facilitates the attainment of the structure of the invention, since in the case of the control of the formation of the structure of the invention, there is no need to take account of any other reactant. Also possible, however, is a reactive compatibilizer.

Compatibilizers used are frequently block copolymers one of whose blocks is compatible with one constituent and the other of whose blocks is compatible with the other constituent. It has emerged that for the formation of the structure of the invention, a compatibilizer is advantageously used that is not based on a block copolymer. Owing to its high philicity for the reactive component, the block that is compatible for the reactive resin restricts the capacity of this component to diffuse, so hindering the formation of a structure of the invention. Sufficient diffusion, however, is necessary to allow the reactive component to reach the dedicated reaction centers.

Surprisingly suitable as compatibilizers are tackifier resins, of the kind known to the skilled person from Satas, for example.

With particular advantage the PSA comprises at least one kind of a preferably at least partly hydrogenated tackifier resin, advantageously those which are compatible with the elastomer component and/or, where a copolymer composed of hard blocks and soft blocks is used, primarily with the soft block (plasticizer resins).

It is advantageous if such a tackifier resin has a softening temperature, as measured by the ring & ball method, of greater than 25° C. It is advantageous, furthermore, if in addition at least one kind of tackifier resin having a softening temperature of less than 20° C. is used. Via such a resin it is possible, if necessary, to fine-tune on the one hand the adhesive performance, and on the other hand the flow behavior on the bonding substrate.

For relatively apolar elastomers, resins in the PSA may advantageously partly or fully hydrogenated resins based on rosin and rosin derivatives, hydrogenated polymers of dicyclopentadiene, partially, selectively or fully hydrogenated hydrocarbon resins based on $C_5$, $C_5/C_9$, or $C_9$ monomer streams, polyterpene resins based on α-pinene and/or β-pinene and/or δ-limonene and/or $\Delta^3$-carene, hydrogenated polymers of preferably pure $C_8$ and $C_9$ aromatics. Aforementioned tackifier resins may be used both alone and in a mixture. Both liquid resins and resins which are solid at room temperature may be employed here. In order to ensure high aging stability and UV stability, preference is given to hydrogenated resins having a degree of hydrogenation of at least 90%, preferably of at least 95%.

For polar elastomers, polar resins are known to be compatible to the skilled person, examples being terpene-phenol or rosin based resins, as may likewise be found in Satas.

The homogeneous mixture may be produced in bulk, in solution, or in the melt. A sufficient sign of the presence of the homogeneous mixture is that the mixture appears visually clear, in other words not turbid. In the solution, the appearance in this context is evaluated at room temperature; in the melt or in bulk, the appearance at the production temperature of the mixture is evaluated.

Turbidities as a result of other ingredients of the mixture, as for example as a result of antiblocking agents in the elastomers, are not considered in this evaluation. They may optionally be removed by centrifugation or filtration, in order for the mixture to be examined for homogeneity.

The mixture is preferably produced in solution, since in this case it is easier to achieve a homogeneous distribution. The selection of the solvents is guided by the constituents.

Preference is given to a combination of at least two solvents, of which one has a solubility parameter difference of not more than 3 $(J/MPa)^{1/2}$ relative to the solubility parameter of one constituent, and the other has a solubility parameter difference of not more than 3 $(J/MPa)^{1/2}$ relative to the solubility parameter of the other constituent.

The solubility parameters (Hilderbrandt parameters) at 25° C. are employed. Since the measurement is very complicated, the values are taken from the Handbook of Solubility Parameters and Other Cohesion Parameters (Allan F. M. Barton: CRC Handbook of Solubility Parameters and Other Cohesion Parameters, CRC Press, 1991). If solubility parameters are not present therein in experimentally determined form, they are calculated according to the Group Contribution Method of Stefanis-Panayiotou (Int. J. Thermophys. 2008, vol. 29, pages 568 to 585).

Layers and adhesive tapes are produced after the mixing of the formulation and before the implementation of the buildup reaction. Layers may be produced in bulk, in solution, or in the melt, using the techniques known to the skilled person for the production of layer structures, more particularly of layers of adhesive.

With particular advantage, the adhesive of the invention can be used in a single-sided or double-sidedly adhesive tape. This mode of administration allows particularly simple and uniform application of the adhesive. The adhesive here is produced before the buildup reaction is performed.

The adhesive may have customary adjuvants added, such as ageing inhibitors (antiozonants, antioxidants, light stabilizers, etc.).

Additives for the adhesive that are typically utilized are as follows:

plasticizers such as, for example, plasticizer oils or low molecular mass liquid polymers such as, for example, low molecular mass polybutenes primary antioxidants such as, for example, sterically hindered phenols secondary antioxidants such as, for example, phosphites or thioethers process stabilizers such as, for example, C radical scavengers light stabilizers such as, for example, UV absorbers or sterically hindered amines processing assistants wetting additives adhesion promoters endblock reinforcer resins and/or optionally further polymers, preferably elastomeric in nature; elastomers which can be utilized accordingly include, among others, those based on pure hydrocarbons, examples being unsaturated polydienes such as natural or synthetically produced polyisoprene or polybutadiene, elastomers with substantial chemical saturation, such as, for example, saturated ethylene-propylene copolymers, α-olefin copolymers, polyisobutylene, butyl rubber, ethylene-propylene rubber, and also chemically functionalized hydrocarbons such as, for example, halogen-containing, acrylate-containing, allyl ether-containing or vinyl ether-containing polyolefins.

The adjuvants or additives are not mandatory; the adhesive also works without their addition, individually or in any desired combination.

Fillers can be used advantageously in the PSAs of the invention. As fillers in the adhesive it is preferred to use nanoscale and/or transparent fillers. In the present context a filler is termed nanoscale if in at least one dimension it has a maximum extent of about 100 nm, preferably about 10 nm. Particular preference is given to using those fillers which are transparent in the adhesive and have a platelet-shaped crystallite structure and a high aspect ratio with homogeneous distribution. The fillers with a platelet-like crystallite structure and with aspect ratios of well above 100 generally have a thickness of only a few nm, but the length and/or width of the crystallites may be up to several μm. Fillers of this kind are likewise referred to as nanoparticles. The particulate architecture of the fillers with small dimensions, moreover, is particularly advantageous for a transparent embodiment of the PSA.

The fillers are not mandatory; the adhesive also operates without the addition thereof individually or in any desired combination.

With preference the PSA of the invention is transparent in the stated sense.

"Transparency" here denotes an average transmittance of the adhesive in the visible range of light of at least 75%, preferably higher than 80%, more preferably higher than 88%, this consideration being based on uncorrected transmission, in other words without subtracting losses through interfacial reflection.

The adhesive preferably exhibits a haze of less than 5.0%, preferably less than 2.5%.

The PSA may be produced and processed from solution, from dispersion and from the melt. Preference is given to its production and processing from solution or from the melt. Particularly preferred is the manufacture of the adhesive from solution. In that case the constituents of the PSA are dissolved in a suitable solvent, for example toluene or mixtures of mineral spirit and acetone, and the solution is applied to the carrier using techniques that are general knowledge. In the case of processing from the melt, this may involve application techniques via a nozzle or a calender. In the case of processes from solution, coatings with doctor blades, knives, rollers or nozzles are known, to name but a few.

Via the coating temperature it is possible in solvent-free operations to influence the coating outcome. The skilled person is familiar with the operational parameters for obtaining transparent adhesive layers. In solvent coating operations, the coating outcome can be influenced via the selection of the solvent or solvent mixture. Here again, the skilled person is familiar with selection of suitable solvents. Combinations of, in particular, apolar solvents boiling below 100° C. with solvents which boil above 100° C., more particularly aromatic solvents, are very suitable.

Coating from solvents or from the melt is advantageous. For such coating, formulations according to the invention offer great advantages, as has already been stated earlier on above.

The adhesive of the invention can be used with particular advantage in a single-sided or double-sided adhesive tape. This mode of presentation permits particularly simple and uniform application of the adhesive.

In the case of a double-sided adhesive tape, the PSA of the invention may be applied on both sides of the carrier (with identical or different composition), or the adhesive applied to one of the two sides may be different from the adhesive of the invention that is specially adapted to the particular end application.

The adhesive tape preferably comprises a layer of the PSA of the invention or it consists of a single or two or more layers of the PSA of the invention.

The general expression "adhesive tape" encompasses a carrier material which is provided on one or both sides with a (pressure-sensitive) adhesive. The carrier material encompasses all sheetlike structures, examples being two-dimensionally extended films or film sections, tapes with an extended length and limited width, tape sections, diecuts (in the form of edge surrounds or borders of an (opto)electronic arrangement, for example), multi-layer arrangements, and the like. For different applications it is possible to combine a very wide variety of different carriers, such as, for example, films, woven fabrics, nonwovens and papers, with the adhesives. Furthermore, the expression "adhesive tape" also encompasses what are called "adhesive transfer tapes", i.e. an adhesive tape without carrier. In the case of an adhesive transfer tape, the adhesive is instead applied prior to application between flexible liners which are provided with a release coat and/or have anti-adhesive properties. For application, generally, first one liner is removed, the adhesive is applied, and then the second liner is removed. The adhesive can thus be used directly to join two surfaces in (opto)electronic arrangements.

Also possible, however, are adhesive tapes which operate not with two liners, but instead with a single liner with double-sided release. In that case the web of adhesive tape is lined on its top face with one side of a double-sidedly releasing liner, while its bottom face is lined with the reverse side of the double-sidedly releasing liner, more particularly of an adjacent turn in a bale or roll.

As the carrier material of an adhesive tape it is preferred in the present case to use polymer films, film composites, or films or film composites that have been provided with organic and/or inorganic layers. Such films/film composites may be composed of any common plastics used for film manufacture, examples—though without restriction—including the following:

polyethylene, polypropylene—especially the oriented polypropylene (OPP) produced by monoaxial or biaxial stretching, cyclic olefin copolymers (COC), polyvinyl chloride (PVC), polyesters—especially polyethylene terephthalate (PET) and polyethylene naphthalate (PEN), ethylene-vinyl alcohol (EVOH), polyvinylidene chloride (PVDC), polyvinylidene fluoride (PVDF), polyacrylonitrile (PAN), polycarbonate (PC), polyamide (PA), polyethersulfone (PES) or polyimide (PI).

In the case of double-sidedly (self-)adhesive tapes, the adhesives used as the top and bottom layer may be identical or different adhesives of the invention, and/or the layer thicknesses thereof that are used may be the same or different. The carrier in this case may have been pretreated according to the prior art on one or both sides, with the achievement, for example, of an improvement in adhesive anchorage. It is also possible for one or both sides to have been furnished with a functional layer which is able to function, for example, as a shutout layer. The layers of PSA may optionally be lined with release papers or release films. Alternatively it is also possible for only one layer of adhesive to be lined with a double-sidedly releasing liner.

In one version, an adhesive of the invention is provided in the double-sidedly (self-)adhesive tape, and also any desired further adhesive is provided, for example one which adheres particularly well to a masking substrate or exhibits particularly good repositionability.

The thickness of the PSA, present either in the form of an adhesive transfer tape or coated on a sheetlike structure, is preferably between 1 μm and 2000 μm, more preferably between 5 μm and 500 μm, and very preferably between about 12 μm and 250 μm.

Layer thicknesses between 50 μm and 150 μm are used when the aim is to achieve improved adhesion on the substrate and/or a damping effect.

Layer thicknesses between 1 μm and 50 μm reduce the amount of material used. However, there is a reduction of the adhesion on the substrate.

For double-sided adhesive tapes it is likewise the case for the adhesive(s) that the thickness of the individual layer or layers of PSA is preferably between 1 μm and 2000 μm, more preferably between 5 μm and 500 μm, and very preferably between about 12 μm and 250 μm. Where another adhesive is used as well as the one adhesive of the invention in double-sided adhesive tapes, it may also be advantageous if its thickness is above 150 μm.

The use of the pressure-sensitive adhesive tape of the invention is particularly advantageous in the following applications:

PSAs with high permeation barrier:
the combination of apolar elastomer with a reactive constituent, in particular, leads to PSAs offering a particularly heightened permeation barrier. The adhesive and also any adhesive tape formed therewith is outstandingly suitable for encapsulating an electronic arrangement, more particularly an optoelectronic or organic electronic arrangement, with respect to permeates, by the adhesive or adhesive tape being applied to and/or around those regions of the electronic arrangement that are to be encapsulated.

As examples of optoelectronic applications which are already available commercially or which are of interest in terms of their market potential, mention may be made here of electrophoretic or electrochromic constructions or displays, organic or polymeric light-emitting diodes (OLEDs or PLEDs) in information and display devices or as lighting, and also of electroluminescent lamps, light-emitting electrochemical cells (LEECs), organic solar cells such as dye or polymer solar cells, inorganic thin-film solar cells, based for example on silicon, germanium, copper, indium, and selenium, perovskite solar cells, organic field-effect transistors, organic switching elements, organic optical amplifiers, organic laser diodes, organic or inorganic sensors, or else organic- or inorganic-based RFID transponders.

An organic electronic arrangement, accordingly, is understood here to be an electronic arrangement which includes at least one electronically functional, at least partly organic constituent—for example, organometallic compounds.

PSAs for structural bonds
By virtue of the high flowability in the state in which the buildup reaction has not yet taken place (producing high adhesion as a result of improved contact with the substrate) and of the dense and filigree network after production of the structure of the invention (high cohesion), which exhibits high shear strength, the PSAs are particularly suitable for the production of structural bonds, especially when the demand is for a bond strength of more than 200 N/cm$^2$ in the dynamic shear test.

The invention is elucidated in more detail below by means of a number of examples, without wishing thereby to restrict the invention.

Test Methods

Unless otherwise stated, all measurements are conducted at 23° C. and 50% relative humidity.

Bond Strength

The bond strengths to steel were determined in analogy to ISO 29862 (Method 3) at 23° C. and 50% relative humidity with a peel speed of 300 mm/min and a peel angle of 180°. The reinforcing film used was an etched PET film with a thickness of 50 μm, as available from Coveme (Italy). The measurement strip was bonded using a roll-on machine at a temperature of 23° C. The adhesive tapes were peeled off immediately after application. The measurement (in N/cm) was obtained as the average from three individual measurements. The testing was performed on non-crosslinked specimens.

Permeability for Oxygen (OTR) and Water Vapor (WVTR)

The permeability for oxygen (OTR) and water vapor (WVTR) was determined in accordance with DIN 53380 Part 3 and ASTM F-1249, respectively. For this purpose the PSA is applied with a layer thickness of 50 μm to a permeable membrane. The oxygen permeability is measured at 23° C. and a relative humidity of 50%. The water vapor permeability is determined at 38° C. and a relative humidity of 90%. The testing was performed on noncrosslinked specimens.

Tensile Test

The characteristic variable for the cohesion of the IPN of the invention was determined in the form of the tensile-stress curve in analogy to DIN EN ISO 527-3. For this purpose, test specimens (form analogous to type 2: measurement length 30 mm, width 4 mm) were investigated at 23° C. with a testing speed of 300 mm/min, with varying epoxide content. The testing was performed on crosslinked specimens.

Tackifier Resin Softening Temperature

The evaluation of the tackifier resin softening temperature is conducted according to the relevant methodology, which is known as ring & ball and is standardized according to ASTM E28.

The tackifier resin softening temperature of the resins is determined using an automatic ring & ball tester HRB 754 from Herzog. Resin specimens are first finely mortared. The resulting powder is introduced into a brass cylinder with a base aperture (internal diameter at the top part of the cylinder 20 mm, diameter of the base aperture in the cylinder 16 mm, height of the cylinder 6 mm) and melted on a hotplate. The amount introduced is selected such that the resin after melting fully fills the cylinder without protruding.

The resulting sample body, complete with cylinder, is inserted into the sample mount of the HRB 754. Glycerin is used to fill the heating bath where the tackifier resin softening temperature lies between 50° C. and 150° C. For lower tackifier resin softening temperatures, it is also possible to operate with a waterbath. The test balls have a diameter of 9.5 mm and weigh 3.5 g. In line with the HRB 754 procedure, the ball is arranged above the sample body in the heating bath and is placed down on the sample body. 25 mm beneath the base of the cylinder is a collecting plate, which has a light barrier 2 mm above it. During the measuring procedure, the temperature is raised at 5° C./min. Within the temperature range of the tackifier resin softening temperature, the ball begins to move through the base aperture in the cylinder, until finally coming to rest on the collecting plate. In this position, it is detected by the light barrier, and at this point in time the temperature of the heating bath is recorded. A duplicate determination is conducted. The tackifier resin softening temperature is the average value from the two individual measurements.

Softening Temperature

The softening temperature of homopolymers, copolymers, hard blocks and soft blocks and uncured reactive resins is determined calorimetrically by means of differential scanning calorimetry (DSC) in accordance with DIN 53765: 1994-03. Heating curves run with a heating rate of 10 K/min. The specimens are measured in Al crucibles with a perforated lid under a nitrogen atmosphere. The heating curve evaluated is the second curve. In the case of amorphous substances, the glass transition temperatures occurring are defined as softening temperature; in the case of (semi) crystalline substances, the melting temperatures. A glass transition can be seen as a step in the thermogram. The glass transition temperature is evaluated as the middle point of this step. A melting temperature can be recognized as a peak in the thermogram. The melting temperature recorded is the temperature at which maximum heat change occurs.

Transmittance

The transmittance of the adhesive was determined in analogy to ASTM D1003-11 (Procedure A (Byk Haze-gard Dual haze meter), standard illuminant D65). There is no correction for interfacial reflection losses. The testing took place on crosslinked specimens having a thickness of about 50 μm.

HAZE Measurement

The HAZE value describes the fraction of transmitted light which is scattered forward at large angles by the irradiated sample. The HAZE value hence quantifies material defects in the surface or the structure that disrupt clear transmission.

The method for measuring the haze value is described in the ASTM D 1003 standard. This standard requires the recording of four transmission measurements. For each transmission measurement, the light transmittance is calculated. The four transmittances are used to calculate the percentage haze value. The HAZE value is measured using a Haze-gard Dual from Byk-Gardner GmbH. The testing took place on crosslinked specimens having a thickness of about 50 μm.

Molecular Weight

The average molecular weight $M_w$ (weight average) is determined by means of gel permeation chromatography (GPC). The eluent used is THF with 0.1% by volume trifluoroacetic acid. Measurement takes place at 25° C. The precolumn used is PSS-SDV, 5 μm, $10^3$ Å, ID 8.0 mm×50 mm. Separation was carried out using the columns PSS-SDV, 5 μm, $10^3$ Å, $10^5$ Å and $10^6$ Å, each with an ID of 8.0 mm×300 mm. The sample concentration is 4 g/l, the flow rate 1.0 ml per minute. Measurement takes place against PS standards.

Dynamic Shear Test

An adhesive transfer tape is bonded between two glass plates (float glass) and cured using UV light. After storage for 24 hours, the assembly is parted in the tensile testing machine at 50 mm/min, at 23° C. and 50% relative humidity, by the two glass plates being pulled apart at an angle of 180°, the maximum force in $N/cm^2$ being recorded. In this case the test specimen investigated is a square specimen having an edge length of 25 mm.

MMAP

MMAP is the mixed methylcyclohexane-aniline cloud point, determined using a modified ASTM C 611 method. Methylcyclohexane is used for the heptane employed in the standard test method. The method uses resin/aniline/methylcyclohexane in a ratio of 1/2/1 (5 g/10 ml/5 ml), and the cloud point is determined by cooling a heated, clear mixture of the three components until complete clouding is just established.

DACP

The DACP is the diacetone alcohol cloud point, and is determined by cooling a heated solution of 5 g resin, 5 g xylene and 5 g diacetone alcohol until the point is reached at which the solution turns cloudy.

The invention is elucidated in more detail below by means of a number of examples, without wishing thereby to restrict the invention.

Examples

Unless otherwise indicated, all quantities in the examples which follow are weight percentages or parts by weight, based on the overall composition without photoinitiator. The amount of photoinitiator is based on the amount of constituent used in the phase to be obtained by the buildup reaction (in the present case, epoxy resin or acrylate resin).

| | Example: | | | | | | | | | |
|---|---|---|---|---|---|---|---|---|---|---|
| | C2 wt % | C1 wt % | 2 wt % | 3 wt % | 4 wt % | 5 wt % | 6 wt % | 7 wt % | 8 wt % | C9 wt % |
| Kraton G 1657 | 50 | 45 | 42.5 | 40 | 37.5 | 35 | 33.4 | 30 | 30 | 0 |
| Uvacure 1500 | 0 | 10 | 15 | 20 | 25 | 30 | 33.3 | 40 | 50 | 100 |
| Regalite R1100 | 50 | 45 | 42.5 | 40 | 37.5 | 35 | 33.3 | 30 | 20 | 0 |
| Triarylsulfonium hexafluoro-antimonate | 0 | 1 | 1 | 1 | 1 | 1 | 1 | 1 | 1 | 1 |

| Comparative example: | C3 wt % |
|---|---|
| Kraton G 1657 | 33.4 |
| SR833s | 33.3 |
| Regalite 1090 | 33.3 |
| Irgacure 500 | 3 |

Raw materials used:
Kraton G 1657 SEBS with 13 wt % block polystyrene content from Kraton The SEBS contained 36 wt % diblock content.
Uvacure 1500 cycloaliphatic diepoxide from Dow Regalite R1100 a fully hydrogenated hydrocarbon resin from Eastman (ring and ball 100° C., DACP = 45, MMAP = 82),
Triarylsulfonium hexa-fluoroantimonate The photoinitiator has an absorption maximum in the 320 mm to 360 mm range and took the form of a 50 wt % strength solution in propylene carbonate.
SR833s tricyclodecanedimethanol diacrylate from Sartomer
Irgacure 500 radical photoinitiator from BASF The copolymer used for the inventive examples and for comparative examples 1 and 2 was an SEBS with 13 wt % block polystyrene content from Kraton. Kraton G 1657 was used. The molar mass (weight average) is about 120 000 g/mol for the triblocks.

The reactive resin selected in examples C1 and also 2 to 8 was Uvacure 1500 from Dow, a cycloaliphatic diepoxide (3,4-epoxycyclohexylmethyl 3,4-epoxycyclohexanecarboxylate). The glass transition temperature of Uvacure 1500 was −53° C.

These raw materials were dissolved at room temperature in a mixture of toluene (300 parts), acetone (150 parts) and special-boiling-point spirits 60/95 (550 parts), to give a 50 wt % solution.

The photoinitiator was added subsequently to the solution.

In comparative example 3, the constituent effecting buildup by means of a cationic buildup reaction was replaced by one which effects buildup by means of a free radical buildup reaction.

The reactive resin used in comparative example 3 was SR833s from Sartomer, a cycloaliphatic diacrylate (tricyclodecanedimethanol diacrylate).

For comparative example 3, preparation took place in analogy to the examples.

As comparative example 4, example 5 from EP 2160443 B1 was selected. Preparation took place in analogy to the details in that specification. The result was a pasty composition.

Consequently it was not possible to carry out bond strength measurements. This composition is therefore not suitable as adhesive for an adhesive tape.

Production of Specimens:

By means of a doctor blade method, the formulation was coated from solution onto a siliconized PET liner and dried at 120° C. for 15 minutes. The coatweight was 50 g/m². The specimens were lined with a further ply of a siliconized but more easily releasing PET liner.

Samples for bond strength measurements were produced from these specimens. Specimens for dynamic shear tests were produced as well. Curing took place using an undoped medium-pressure mercury lamp with a UV dose (total UV-A+B determined using the Power Puck from EIT) of 2000 mJ/cm².

For comparative example 4, a test rod was coated directly with the composition at a thickness of 50 μm, then contacted with the second test rod, and the assembly was cured in an oven at 70° C. for 6 hours.

Determinations were also made of the transmittance and the haze. The results are summarized in the table below:

| Example | Bond strength [N/cm] | Dynamic shear strength [N/cm²] | Transmittance [%] | Haze |
|---|---|---|---|---|
| C1 | 6.9 | 40 | 92 | 1.2 |
| 2 | 7.4 | 110 | 92 | 1.4 |
| 3 | 6.4 | 150 | 91 | 1.3 |
| 4 | 6.1 | 160 | 91 | 1.2 |
| 5 | 5.5 | 250 | 91 | 1.3 |
| 6 | 5.5 | 270 | 91 | 1.4 |
| 7 | 5.0 | 310 | 92 | 1.6 |
| 8 | 4.2 | 240 | 89 | 3.1 |
| C3 | 5.8 | 180 | 92 | 1.5 |
| C4 | — | 140 | 90 | 2.6 |

It is apparent that the dynamic shear strength increases considerably from a concentration of 15% of the reactive constituent of the hard phase. This can be attributed to the formation of a network from connected nanoparticles, and was also observable in scanning electron micrographs. In comparative example C1, there were only isolated particles or clusters thereof present, but they were not connected to form a continuous network.

FIG. 1 shows a scanning electron micrograph of example 6. The particulate hard phases of crosslinked epoxide with a size around 50 nm form macroscopic superstructures composed of these particles. This connected nanoparticle network, with diverse passages, completely pervades the adhesive.

Figure 2:
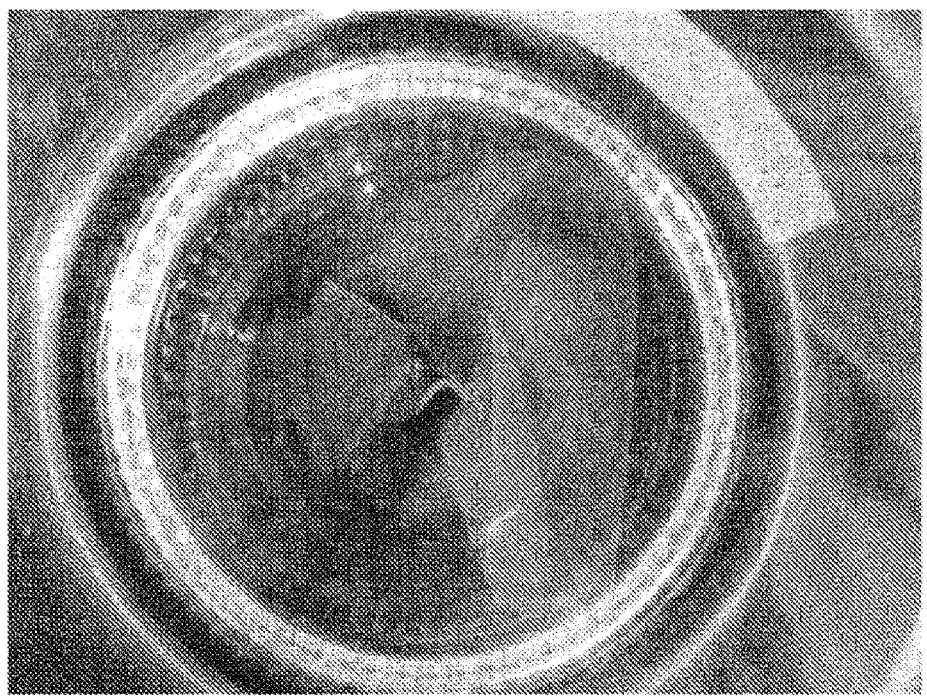
FIG. 2 is a photograph showing the completeness of the connected nanoparticle network of the adhesive film of example 6.

The completeness of the network can be seen particularly well in the photograph in FIG. 2. Still clearly apparent here, in free suspension in the solvent, is the geometry of an adhesive film according to example 6 after three months of extraction in toluene. Within this time, the noncrosslinked elastomer phase and the tackifier resin were extracted completely. This shows beyond doubt that the crosslinked—and hence insoluble—particles contact one another and form a continuous superstructure. If the particles were not connected with one another, the adhesive film would break down completely and would no longer be perceptible visually as a geometry. This completeness of the network is also evident in the high shear strengths for this example.

In view of the increasing fraction of the hard phase, there is an increase in shear strengths from example C1 to example 7, with transmittance and haze remaining largely the same. Then, at a concentration of 50% of the reactive constituent of the hard phase (example 8), the transmittance drops off slightly and the haze value increases sharply. This already suggests a change in morphology. Scanning electron micrographs show a connected nanoparticle network only in sub-regions; in other regions, there is no longer any recognizable internal structure of the hard phase. The hard phase domains become substantially larger in some regions; known co-continuous structures are formed in some regions. In some regions, moreover, phase inversion can already be observed.

Figure 3:
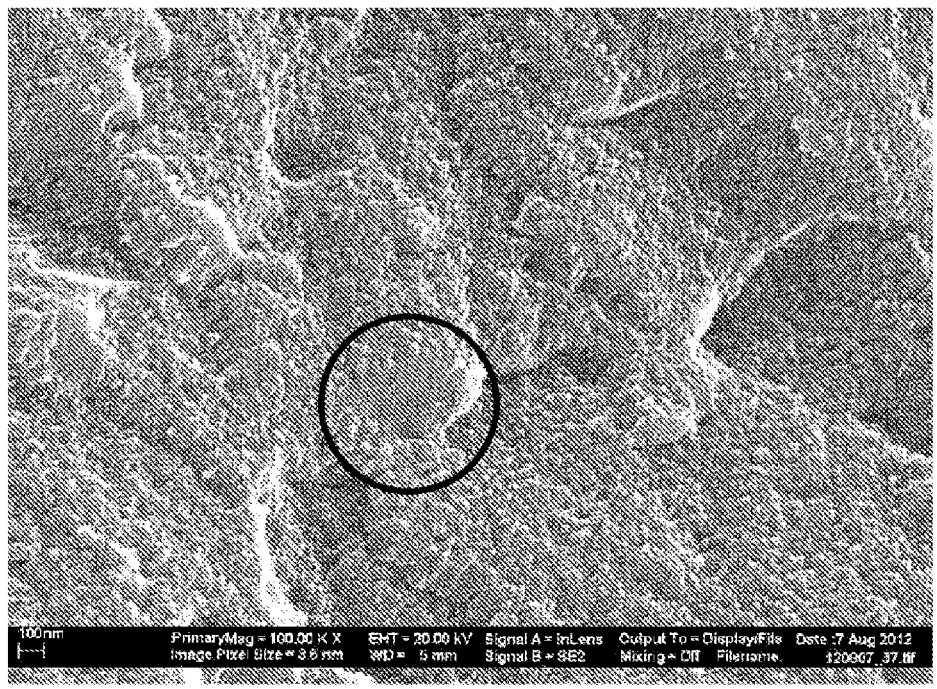
FIG. 3 is an electron micrograph of the adhesive of comparative example C3.

In comparative example C3, in comparison to the similarly constituted example 6, a substantially lower shear strength is achieved. This might suggest that the network is not continuously connected. Electron micrographs show clusters of compact hard phase (FIG. 3) which exhibit substantially coarser dimensions than the connected nanoparticle network. The cryofracture method of sample preparation shows the rough fracture surface, which permits only a sporadic insight into the interior of the structure (circular marking). A compact structure is evident here. This structure forms as a result of the rapid, uncontrolled crosslinking. Coherent superstructures of connected nanoparticles, accordingly, do not form unarbitrarily, but instead form preferably in the case of a slow reaction regime as is the case, for example, for cationic and controlled-radical polymerizations.

In comparative example 4 there is no PSA; the composition is pasty. Scanning electron micrographs show a structure similar to that for comparative example 3. Here again, the rapid radical polymerization leads to a relatively coarse and compact structure. Transmittance and haze are somewhat poorer than for comparative example 3, attributable to the lack of the compatibilizing effect of the tackifier resin and to the higher hard phase fraction. The fact that a decidedly transparent adhesive is nevertheless achieved can be attributed to the similarity between the refractive indices of the hard phase and the elastomer phase, as already noted in EP 2160443 B1.

Results of the Permeation Measurement:

The table below shows the WVTR and the OTR for the inventive and comparative examples, with the fraction of the hard phase increasing continually from C2 via C1 and up to example 8, with C9 representing the pure hard phase.

| Example | OTR [$cm^3 \, m^{-2} d^{-1} bar^{-1}$] | WVTR [$g \, m^{-2} d^{-1}$] |
| --- | --- | --- |
| C2 | 3400 | 24 |
| C1 | 2913 | 26 |
| 3 | 2575 | 31 |
| 6 | 2041 | 38 |
| 8 | 1702 | 80 |
| C9 | 242 | 123 |

The OTR is evidently dependent on the internal cross-sectional area proportions of the constituents, since oxygen permeates through the elastomer phase to a substantially greater extent than through the hard phase. When the epoxide content of the IPNs is varied, the OTR values exhibit a virtually linear correlation (the greater the amount of epoxide, the lower the OTR). There is a continuous elastomer phase through which the oxygen migrates. The greater the extent to which this phase is displaced by epoxide, the smaller the area of passage becomes.

The pure elastomer resin system already has a low WVTR of 24 g/m$^2$d; the pure epoxide (by virtue of its polarity) has a very high WVTR of 123 g/m$^2$d. The WVTR here does not increase in proportion with the increasing epoxide fraction. This suggests that the effect in question here is not a cross-sectional area effect, the WVTR instead being also influenced substantially by the morphology. For C1 it is shown microscopically that the hard phase is in disperse form. Consequently, no permeation channels are formed in the IPN, and so the WVTR is close to that of the elastomer phase.

For examples 3 and 6, however, microscopically and by way of the shear test, it is shown that a connected nanoparticle network is formed, and hence that permeation channels exist. Nevertheless, the WVTR does not rise in proportion with the hard phase fraction. For instance, for example 6, a WVTR of almost 60 would be expected in the case of proportional increase.

This can be explained by the particular structure of a connected nanoparticle network: The nanoparticles are connected to one another virtually in point form. As a result, there is a drastic reduction in the permeation cross section, this being so in numerous instances within a permeation channel, and so the WVTR is kept low in spite of an increasing hard phase fraction. Only when there is partial formation of a coarser, bicontinuous morphology, in example 8, does the WVTR increase sharply, since this entails the creation of permeation channels with a significantly more uniform cross section.

The PSAs of the invention are therefore particularly suitable for the sealing of the packaging and of the encapsulation of water-sensitive materials.

Results of the Tensile Test:

Stress-strain curves were recorded for examples 1, 3, 6, and 7.

Figure 4:
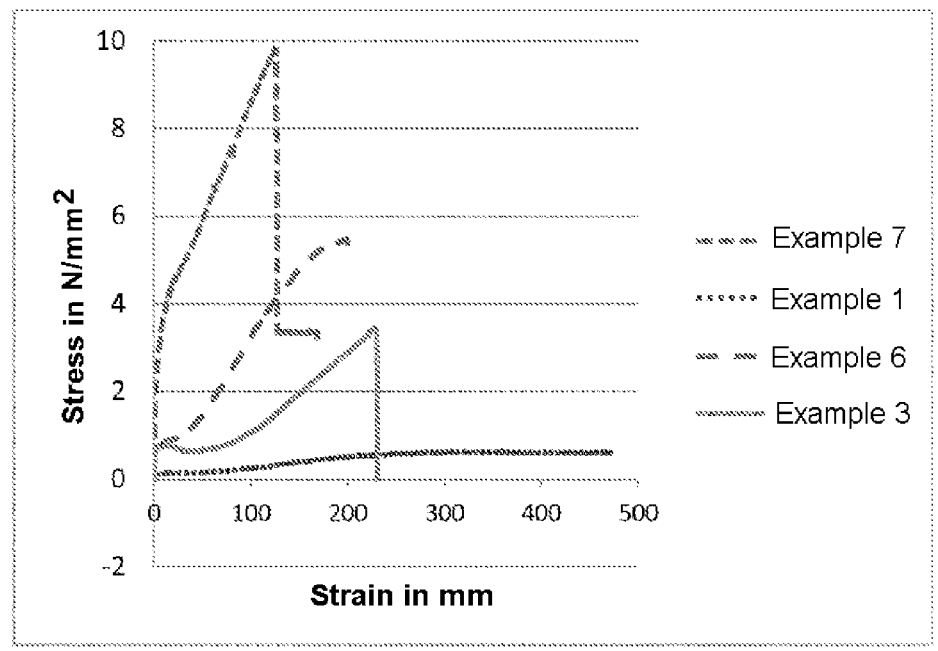
FIG. 4 illustrates stress-strain curves for examples 1, 3, 6 and 7.

From the profile of the graphs (FIG. 4) it can be estimated that continuous structures of connected epoxide nanoparticles are not present, in the systems investigated, until the epoxide fraction is more than 10%, since at that point there is a high modulus in the linear-elastic range of strain (up to about 3 mm). In the further profile as well, examples 3, 6, and 7 exhibit a much higher modulus than example 1. The low initial rise in example 1 points to the presence of a substantially disperse phase of the epoxide, which does not produce any significant increase in modulus.

The invention claimed is:

1. A structural adhesive bond formed with a pressure-sensitive adhesive, the pressure-sensitive adhesive comprising:
    at least one kind of an at least partly hydrogenated tackifier resin primarily compatible with at least one styrene block copolymer;
    a first constituent forming a first phase having a differential scanning calorimetry softening temperature of less than 23° C., the first phase comprising:
       vinylaromatic block copolymers, and
       at least one of the at least one styrene block copolymer, the at least one of the at least one styrene block copolymer comprising an elastomer block comprised of unsaturated, partly, or fully hydrogenated polydiene; and
    a second constituent forming a second phase that is formed from a crosslinking buildup reaction, the second phase having a differential scanning calorimetry softening temperature greater than 23° C. and a morphology of a connected nanoparticle network, the second phase comprising epoxide reactive components,
    wherein
    the crosslinking buildup reaction forms an interpenetrating network comprising the first phase and the second phase,
    a mass ratio of the first phase to the second phase is between 85:15 and 50:50, and
    the pressure-sensitive adhesive is transparent in the visible light range of the spectrum.

2. The structural adhesive bond of claim 1, wherein the structural adhesive bond is disposed on a single-sided tape.

3. The structural adhesive bond of claim 1, wherein the structural adhesive bond is disposed on a double-sided tape.

4. The structural adhesive bond of claim 3, wherein the structural adhesive bond is formed with a pressure-sensitive adhesive.

5. The structural adhesive bond of claim 4, wherein the interpenetrating network has a softening point that is greater than 23° C.

6. The structural adhesive bond of claim 5, wherein the mass ratio of the first phase formed after the buildup reaction to the second phase formed after the buildup reaction is between 80:20 and 60:40.

7. The structural adhesive bond of claim 1, wherein the interpenetrating network has a softening point that is greater than 23° C.

8. The structural adhesive bond of claim 1, wherein the mass ratio of the first phase formed after the buildup reaction to the second phase formed after the buildup reaction is between 80:20 and 60:40.

9. A method for forming a structural adhesive bond which comprises forming said structural adhesive bond with the pressure-sensitive adhesive of claim 1.

10. A method for forming a structural adhesive bond which comprises forming said structural adhesive bond with a single-sided adhesive tape formed with the pressure-sensitive adhesive of claim 1.

11. A method for forming a structural adhesive bond which comprises forming said structural adhesive bond with a double-sided adhesive tape formed with the pressure-sensitive adhesive of claim 1.

12. A method for forming a structural adhesive bond which comprises forming said structural adhesive bond with the pressure-sensitive adhesive of claim 7.

13. A method for forming a structural adhesive bond which comprises forming said structural adhesive bond with a single-sided adhesive tape formed with the pressure-sensitive adhesive of claim 7.

14. A method for forming a structural adhesive bond which comprises forming said structural adhesive bond with a double-sided adhesive tape formed with the pressure-sensitive adhesive of claim 7.

15. A method for forming a structural adhesive bond which comprises forming said structural adhesive bond with the pressure-sensitive adhesive of claim 8.

16. A method for forming a structural adhesive bond which comprises forming said structural adhesive bond with a single-sided adhesive tape formed with the pressure-sensitive adhesive of claim 8.

17. A method for forming a structural adhesive bond which comprises forming said structural adhesive bond with a double-sided adhesive tape formed with the pressure-sensitive adhesive of claim 8.

18. A method for forming a structural adhesive bond which comprises forming said structural adhesive bond with the pressure-sensitive adhesive of claim 6.

19. A method for forming a structural adhesive bond which comprises forming said structural adhesive bond with a single-sided adhesive tape formed with the pressure-sensitive adhesive of claim 6.

20. A method for forming a structural adhesive bond which comprises forming said structural adhesive bond with a double-sided adhesive tape formed with the pressure-sensitive adhesive of claim 6.

* * * * *